E. M. DEVANY.
BRACE FOR POSTS.
APPLICATION FILED JULY 23, 1908.
903,686.
Patented Nov. 10, 1908.
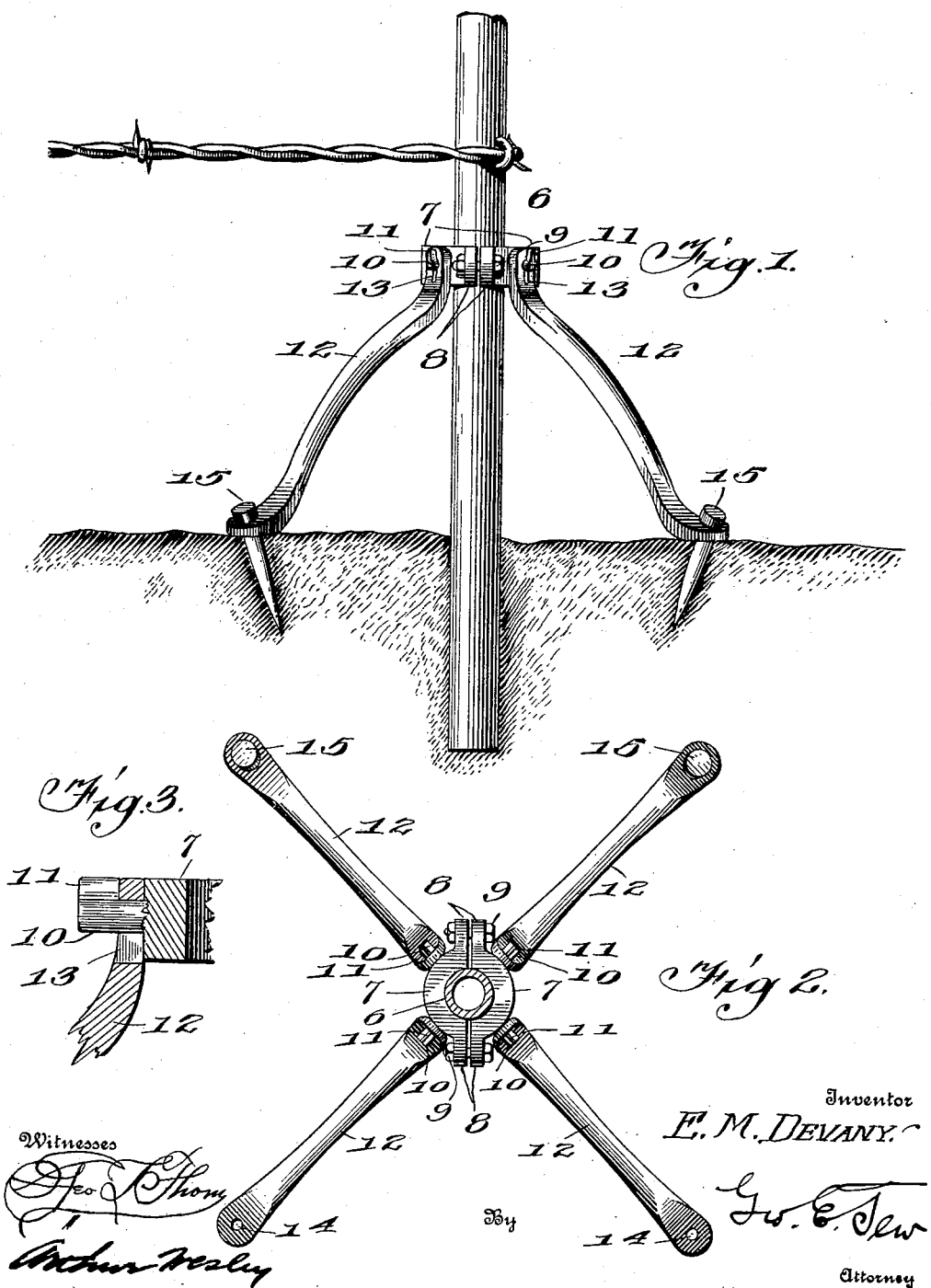

UNITED STATES PATENT OFFICE.

EDMUND M. DEVANY, OF DEVILS LAKE, NORTH DAKOTA.

BRACE FOR POSTS.

No. 903,686.  Specification of Letters Patent.  Patented Nov. 10, 1908.

Application filed July 23, 1908. Serial No. 445,029.

*To all whom it may concern:*

Be it known that I, EDMUND M. DEVANY, citizen of the United States, residing at Devils Lake, in the county of Ramsey and State of North Dakota, have invented certain new and useful Improvements in Braces for Posts, of which the following is a specification.

This invention relates to braces for posts, and particularly for fence posts, although, with little or no modification, it may be applied to posts or staffs of various kinds.

The object of the invention is to provide an improved brace which can be quickly applied and fastened to the post and to the ground, and which can also be quickly removed when necessary.

The invention comprises a collar made in two parts and adapted to be secured around the post, and having one or more lugs projecting therefrom. Legs are connected to these lugs in a novel manner, and are attached to the ground by means of stakes driven through the same.

The invention is illustrated in the accompanying drawings in which—

Figure 1 is a side elevation of a fence post having the improved brace applied thereto; Fig. 2 is a top view; Fig. 3 is a detail in section.

Referring specifically to the drawings, 6 indicates a post, which is shown as circular in cross section, but which may be any shape desired. This post is set in the ground in the usual manner. The post is encircled by a collar consisting of two half parts 7 with ears 8 at the ends, and bolts 9 extending through said ears to clamp the parts together and upon the post. The sections forming the collar have lugs 10 projecting outwardly or horizontally therefrom, and each lug is provided at its outer end with an upstanding part 11 which is of less thickness than the main part of the lug, being beveled on each side to a rather narrow edge at the top.

The legs 12 are connected to the lugs. Each leg has at its upper end a key-hole slot 13 the larger or round end of which is of proper size to fit the neck of the lug, and the smaller or narrow end of which is of proper size to pass over the narrow head 11 of the lug when the leg is in reversed or upside down position. That is, normally, the narrow part of the key-hole slot extends downwardly, but by swinging the leg around to inverted position, said narrow part is brought in line with the narrow part 11 of the lug, so that the leg can be slipped on or off the lug and thus attached or detached. The foot of each leg has a hole 14 therethrough and it is fastened to the ground by means of a stake 15 driven through the hole and into the ground.

On line posts one or two braces will ordinarily be sufficient, but on corner posts or posts standing alone more braces may be used, the collar being provided with number of lugs accordingly.

In applying the invention, the post is first set, and the collar is clamped thereon. The legs are then slipped on the lugs in inverted position, and then swung around to depending position, and the stakes driven through the feet into the ground. In consequence of the peculiar construction of the lugs and the slots, the braces cannot become detached except by taking out the stakes and turning the braces up to inverted position; but this can be readily done when desired and it is unnecessary to loosen any fastenings or use any tools beyond, perhaps, a crow bar to remove the stakes. For use with square posts, or those having other shapes, the collar will be modified accordingly.

The invention will be found particularly useful in connection with round metal posts, which are ordinarily braced with some difficulty. It can also be used on telegraph poles, hitching posts, and the like.

I claim:

1. A brace for a post, comprising a collar adapted to be fastened on the post and having a lug with a lateral offset at the end thereof, and a leg having an opening to receive the lug, the opening being shaped to pass the offset therethrough when the leg is in abnormal position and to be locked behind the offset when in normal position, and means to fasten the leg to the ground.

2. A brace for a post, comprising a lug connected to the post and projecting outwardly therefrom, the lug having an offset at the outer end thereof, and a leg having an opening in the end to receive the lug, the opening being enlarged on one side to pass the offset when the leg is raised from the ground, and means to fasten the leg to the ground.

In testimony whereof, I affix my signature in presence of two witnesses.

EDMUND M. DEVANY.

Witnesses:
C. M. FISHER,
A. V. HOEY.